Aug. 15, 1961     E. LOWE     2,996,114

METHOD AND APPARATUS FOR VACUUM DEHYDRATION

Filed April 11, 1957     2 Sheets-Sheet 1

EDISON LOWE
INVENTOR

BY R. Hoffman
ATTORNEY

Aug. 15, 1961 — E. LOWE — 2,996,114
METHOD AND APPARATUS FOR VACUUM DEHYDRATION
Filed April 11, 1957 — 2 Sheets-Sheet 2

EDISON LOWE
INVENTOR
BY R. Hoffman
ATTORNEY

United States Patent Office 2,996,114
Patented Aug. 15, 1961

2,996,114
METHOD AND APPARATUS FOR VACUUM DEHYDRATION
Edison Lowe, El Cerrito, Calif., assignor to the United States of America as represented by the Secretary of Agriculture
Filed Apr. 11, 1957, Ser. No. 652,323
7 Claims. (Cl. 159—7)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the government of the United States of America.

This invention relates to and has as its prime object the provision of novel apparatus and methods for dehydrating materials under vacuum. A particular object of the invention is the provision of apparatus and methods for the vacuum dehydration of materials, especially concentrated liquid foods, wherein the material undergoing dehydration is maintained in a puffed (expanded) state and the removal of moisture is conducted on a continuous and efficient basis. Further objects and advantages of the invention will be obvious from the following description and the attached drawing.

Referring to the drawing.

Figure 1:
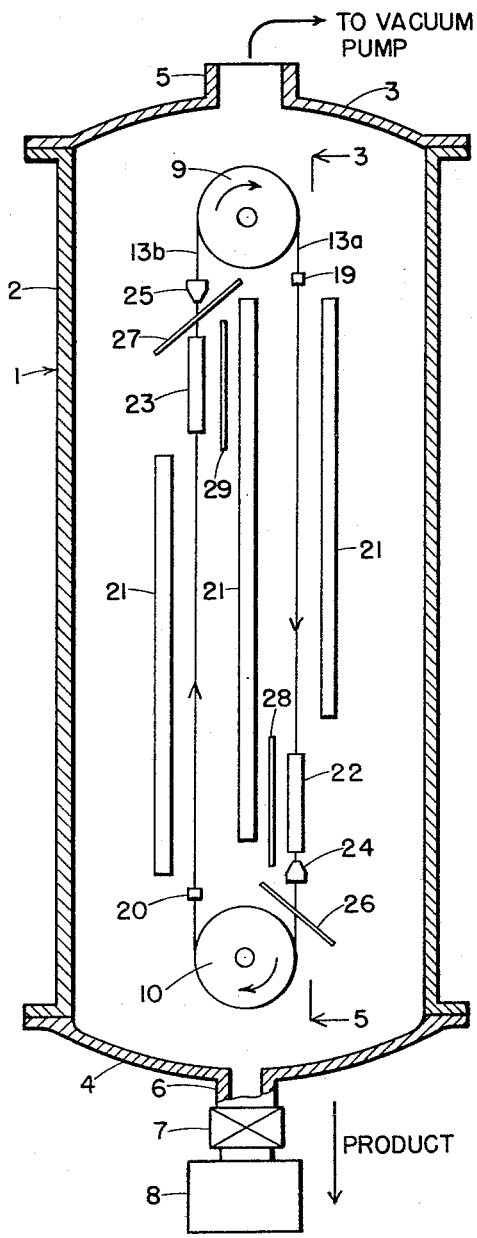
FIG. 1 is a front elevation, partly in cross-section, of an embodiment of the device of the invention.
Figure 3:
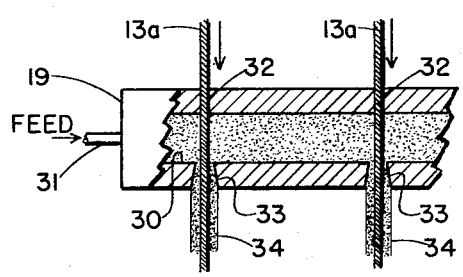
Figure 4:
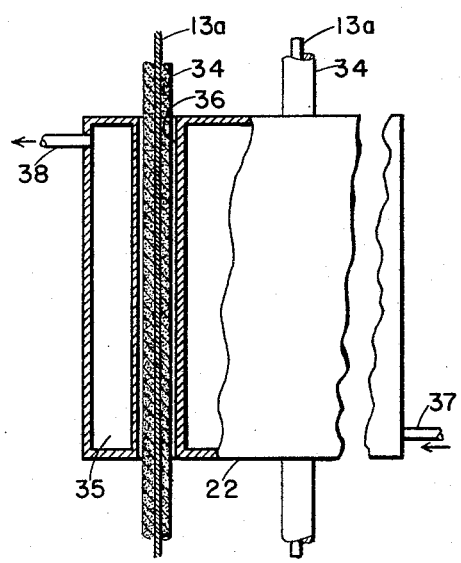
Figure 5:
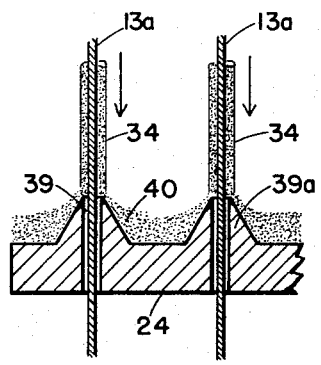

FIGS. 3, 4, and 5 are cross-sections, on an exaggerated scale, of the feeding device, cooling device, and scraping device, respectively, as these devices are viewed on plane 3—5 of FIG. 1.

Figure 6:
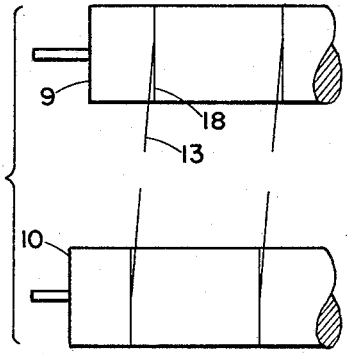

FIG. 6 depicts offset guide means for axially rotating the wire carriers.

Figure 7:
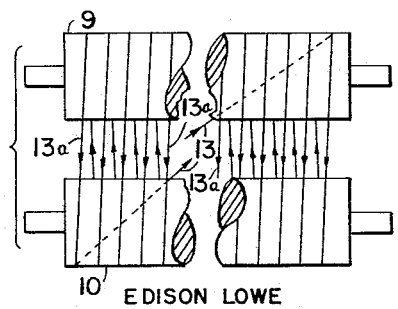

FIG. 7 depicts a modification, described more fully below, wherein a single endless wire is passed around the drums a plurality of times.

It has been shown in the prior art that concentrated liquid foods, especially concentrated fruit and vegetable juices, can be effectively dehydrated by what has come to be known as the puff-drying process. In this technique, the concentrated liquid is subjected to vacuum and to heat so that the material puffs or expands due to expulsion of steam or other gases in the material. The rate of application of heat is to controlled that during the entire dehydration, the material retains this puffed structure. As a final result, the dried product has a porous structure and consequently displays an exceedingly high rate of water absorption when it is contacted with water to form a reconstituted juice. This is, of course, a very desirable property of the final product. Various techniques have been investigated for conducting the puff-drying. One known technique involves the use of a vacuum tray dryer. This procedure gives excellent results but suffers from the disadvantage that it is a batch process and inherently not efficient for commercial production. Another procedure which has been investigated involves conducting the vacuum dehydration in a vacuum belt drier. This device essentially consists of a large, vacuum-tight cylinder within which is disposed an endless stainless-steel belt supported on two rotating drums. The concentrate is spread on the outer surface of the belt and is transported by the belt over the first of the drums which is internally heated by steam. Further heating of the material on the belt is accomplished by infra-red heaters which direct their rays on the material. The dried material is finally transported over the second drum which is internally cooled by circulating cold brine. This cooling sets the structure of the dried material so that it will not collapse in volume when subsequently scraped off the belt and removed from the cylinder through an air lock or similar device.

The vacuum belt drier as described above suffers from several serious disadvantages, all of them flowing from the fact that the device utilizes a belt as the transporting medium for the material to be dried. These various disadvantages are explained below:

(1) In the first place it is difficult to uniformly distribute the material to be dried on the belt. Under the best of circumstances the material tends to be deposited thicker at some places on the belt than at others. This, of course, results in non-uniform puffing and non-uniform drying.

(2) In order to achieve some degree of uniformity of distribution of material on the belt it is necessary to employ a feed roll, or trowel roll as it is often termed. In rotating, this roll trowels the concentrate on the belt. However, the use of such a device produces the disadvantage that the troweling action of the roll tends to de-puff the material. Thus, it is customary to aerate the concentrate prior to introducing it into the drier to enhance the degree of expansion or puffing. However, the troweling action tends to press gas out of the puffed material so as to reduce its volume and hence obtain this undesired de-puffing action.

(3) Another point is that it not possible with a trowel roll to feed the material onto the belt automatically. Variations occur in the amount of material fed per unit time so that it is essential to observe the action of the roll through a window in the dryer cylinder and manually change the amount of material supplied to the bite between the roll and the belt.

(4) Another point is that in using a belt, it is necessary to employ supporting drums of a very large diameter so as not to overstress the belt and cause it to break. This situation is explained further as follows: In the dehydration of food materials, it is necessary to use a stainless-steel belt to avoid contamination of the food. Such belts have a low yield strength on the order of 35,000 p.s.i., because they are in an annealed state necessary to relieve stress in the weld required to form the endless belt. Since the stress in the outer fibers of the belt is directly proportional to the thickness of the belt and inversely proportional to the diameter of the drums about which the belt travels, it is necessary to employ drums having a diameter on the order of 3 to 8 feet in order to avoid stressing the belt above its yield point. The use of such large drums necessitates the use of a large cylinder to hold the drums and associated equipment and hence the device is very expensive. Also, the large diameter drums require the use of a long belt which is in itself a very expensive item.

(5) In order to keep the belt tracking properly on the drums, it is necessary to employ a complex apparatus which adjusts the position of the belt in the direction along the axes of the drums. If such device is not used, the belt will immediately move to one side or the other of the drums and disrupt the operation of the device.

(6) A prime disadvantage of the use of a belt is that only one side of the belt is employed. The material to be dried is deposited on the outer surface of the belt and thereon dried. The under side of the belt cannot be so used because this side of the belt contacts the surfaces of the heating and cooling drums.

(7) As noted above, it is necessary to cool the dried material prior to scraping it off the belt whereby to set it in its expanded state. In this cooling operation, the largest load on the cooling system is due to the heat content of the belt itself. Thus in the belt device, the greatest proportion of the energy input into the drier is expended in heating and cooling the belt rather than the material being processed in the system.

In accordance with the present invention much more efficient results are obtained when the belt in the dehydrator is replaced by a series of elements of small, circular cross-section, for example, metallic wires. The dehydrator in accordance with this invention comprises essentially a vacuum-tight vessel within which are disposed a plurality of endless wires supported on rotating drums. Means are provided for sequentially depositing the material on the wires, subjecting the material to heat to evaporate moisture therefrom, cooling the dried material, and removing the cooled, dried material from the wires.

The present device, by elimination of the conventional belt, yields many advantages results as follows:

(1) In the first place, it is easy to uniformly deposit the material to be dried on the wires. This can readily be done by passing the wire through an orifice through which the material is continuously extruded at a controlled rate. No troweling roll or other moving parts are needed.

(2) The method of feeding made possible by use of the wire carrier does not cause any de-puffing of the aerated material being fed onto the wire.

(3) The extrusion feeding onto the wire carrier may be conducted automatically to deposit predetermined amounts of the material on the wire per unit time. No constant manual adjustment as with feeding onto a belt is required.

(4) A very important advantage in the use of wires as carriers for the material to be dried lies in the fact that it makes possible the employement of drums of small diameter. The significant point is that it is entirely possible to produce stainless-steel endless wires which are work-hardened and which have yield points around 150,000 p.s.i. Such wires can be supported on drums as small as 6–12" in diameter without overstressing the outer fibers of the wires. The employment of small drums means a great saving in cost as not only are the drums small but the vessel that contains them may be likewise small in contrast with a system wherein drums several feet in diameter are needed. Moreover, the wires cost only a fraction of the cost of a belt.

(5) In using wires to carry the material to be dried, it is an easy matter to keep the wires tracking properly on the drums. This is done simply by machining the drums to provide grooves in which the wires run. The complex apparatus required for the tracking of a belt is completely eliminated.

(6) Another very important advantage connected with the use of a wire as the carrier is that the material can be deposited about the entire circumference of the wire. This entails many important advantages over the system wherein the material is deposited only on one surface of a belt. In the system of this invention, the material itself makes up the primary load on the system; the energy involved in heating and cooling is thus utilized efficiently. Since the wire is buried within the layer of material, little of the energy is expended in heating or cooling it. Moreover, since the material to be dried is exposed on all sides to heating and vacuum, the dehydration proceeds efficiently and uniformly. This is in sharp contrast to the belt system wherein only one surface of the material is exposed to heat and vacuum, the other is in contact with the surface of the belt.

(7) A further advantage of the device of the invention is that the wires can be readily rotated about their own axes by employing supporting drums having offset grooves. This rotation assists in obtaining uniform deposition of material to be dried and uniform exposure of the material to conditions of heating and cooling.

Reference is now made to the drawing wherein embodiments of the apparatus of the invention are depicted. The structure and functions of the device are explained as follows:

Vessel 1, made up of cylinder 2, cap 3, and bottom plate 4, provides a vacuum-tight compartment within which the dehydration and associated functions take place. Conduit 5 is connected to a conventional device, such as a vacuum pump, steam ejector or the like whereby the interior of vessel 1 may be evacuated. Dried product is removed via conduit 6 and valve 7 through a conventional air-lock system 8, which allows withdrawal of product without breaking the vacuum within vessel 1.

Within vessel 1 are positioned drums 9 and 10 which support and traverse the endless wire carriers. One end of the axle of each drum protrudes through a vacuum-tight journal 11 (see FIG. 2) to the exterior of the vessel and carries a pulley 12. By application of conventional driving equipment to pulleys 12, drums 9 and 10 are caused to rotate in the same direction at the same speed.

Supported on drums 9 and 10 are elements 13, each of these being an endless loop of wire. Although each of these comprises an endless strand, the individual halves are designated by the indicia (*a*) and (*b*) to facilitate explanation of the operation of the device. Grooves 18 are provided in drums 9 and 10 to maintain the positions of the wires.

For the sake of simplifying the drawing, only two endless wires are depicted. In actual practice many more wires are provided to utilize the available space in vessel 1 more efficiently. Moreover, instead of using a plurality of endless wires one can utilize a single endless wire which is repeatedly threaded over drums 9 and 10 to provide a plurality of wire strands available as carriers for the material to be dehydrated. This modification is shown in FIG. 7.

Material to be dried is deposited onto the downwardly moving strands 13*a* by extrusion device 19 and onto the upwardly moving strands 13*b* by extrusion device 20. The material is then transported by the wire strands past infra-red heaters 21 whereby the material is heated and under the simultaneous influence of vacuum is dehydrated. The dried material on strands 13*a* is cooled in its passage through cooler 22; dried material on strands 13*b* is cooled in its passage through cooler 23. The cool, dry material on strands 13*a* is removed from the wires by scraper device 24; corresponding material on strands 13*b* is removed by scraper device 25. Dried material removed by scraper 24 is deflected by guard 26 and falls to the bottom of vessel 1. A similar guard 27 is provided near the top of vessel 1 to deflect the material dislodged by scraper 25. Guards 26 and 27 each consist of a metal plate provided with holes 14 through which the wires pass with a relatively small clearance. To protect coolers 22 and 23 from the heat rays emitted from the center row of heaters 21 there are provided metallic shields 28 and 29. Heaters 21 are electrically operated and of conventional design adapted to emit infrared rays. The heaters may take the form of coils of nichrome wire wound on heat resistant insulating material. Suitable equipment is preferably provided for regulating the heat output of the heaters.

Reference is now made to FIG. 3 which depicts on an exaggerated scale the design and function of extrusion device 19. The device includes an elongated chamber 30 provided with a conduit 31 extending outside of vessel 1. Material to be dehydrated, for example aerated tomato juice concentrate, is forced by a pump 31a (FIG. 2) at a predetermined pressure through conduit 31 into chamber 30. The wires to be coated, 13a, pass into the chamber through apertures 32 and out of the chamber through orifices 33. As evident in the figure, apertures 32 are so dimensioned as to pass wires 13a with a small clearance so that apertures 32 are effectively sealed by the presence of wires 13a. Orifices 33 are larger to permit the wires and material coating to pass through them. Due to the combined effect of the pumping action and the movement of the wires the latter are coated with an annular coating 34 of the material to be dried. As the coated wire emerges from the chamber 30, the material 34 is subjected to the low pressure conditions existing in vessel 1 and the coating expands by enlargement of the gas bubbles contained therein. The material is then in prime condition for the dehydration operation.

Referring now to FIG. 4, there is depicted cooler 22 on an exaggerated scale. This cooler comprises a hollow jacket 35 and passages 36 through which the coated wires pass. A cooling medium such as cold brine is pumped through jacket 35 via inlet 37 and outlet 38, these conduits extending to the outside of vessel 1. In passing through the passages 36 the dried coatings 34 on wires 13a are cooled, mainly by radiation of the heat in the material to the cold medium in the jacket. Usually the temperature of the brine in the jacket 35 is regulated so that the coating is cooled to a temperature of about 90–110° F., as required by different materials being processed. To facilitate entry of the coated wires, passages 36 may be of tapered construction to provide passageways wider at the top than at the bottom.

Figure 2:
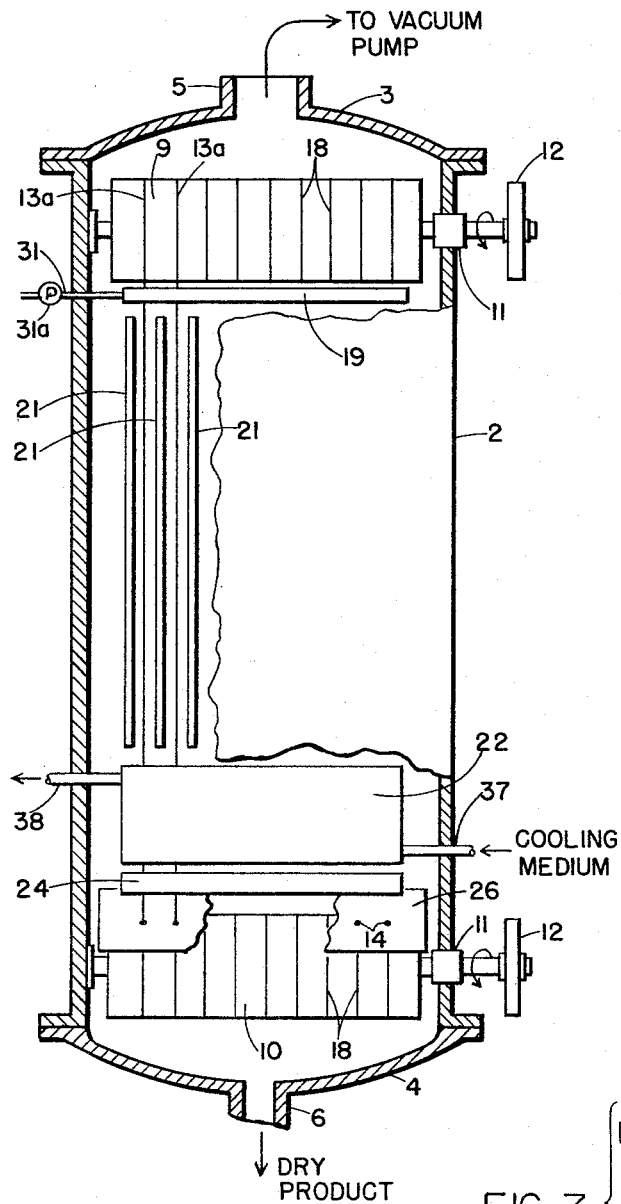
FIG. 2 is a side elevation, partly in cross-section, of the embodiment of FIG. 1.

Reference is now made to FIG. 5 which illustrates on an exaggerated scale the design and functions of the scraping device 24 for removing the cooled dried material from the wires. The scraper comprises an elongated bar provided with bosses 39a and apertures 39 through which wires 13a may pass with a small clearance. In passing, the coating 34 now in cooled, dry, hence friable condition, is removed in the form of flakes or similar small particles 40. As noted above, the material 40 eventually falls on guard 26 (FIGS. 1 and 2) and from there to the bottom plate 4 and out of the vessel 1 via conduit 6. If it is desired to further cool the dried material, scraper 24 can be of hollow construction so that a cooling medium can be circulated through it. Any material not removed by scraper 24 is subsequently dislodged as wires 13a pass through holes 14 in guard 26 (FIG. 2).

As is evident in FIG. 1, the wires 13a when cleared of the dried material by going through scraper 24 pass about lower drum 10 and proceed upwardly toward drum 9. In their upward passage the wires, now designated as 13b, are coated with material to be dried, the material dried, cooled and scraped off as described above in connection with the downwardly moving strands. The extrusion device 20, cooler 23, and scraper 25 are constructed similarly to their counterparts 19, 22 and 24 except that extrusion device 20 and scraper 25 are in inverted position to operate properly on the wire now moving in the opposite direction. Thus the extrusion device 20 is like extrusion device 19 depicted in FIG. 3 except that the position of apertures 32 and orifices 33 are reversed so that the wires 13b enter the bottom of device 20 through apertures 32 and leave the top of the device 20 with attached coating through orifices 33. The construction of extrusion device 20 can be readily visualized by viewing FIG. 3 in inverted position. In the case of scraper 25, bosses 39a are directed downwardly. The construction of scraper 25 can be visualized by simply viewing FIG. 5 in inverted position. Cooler 23 is the same as cooler 22. If cooler 23 is provided with tapered passages for the coated wires, these passages are wider at the bottom than at the top.

As noted briefly above, it is preferable to constantly rotate the wires at a slow rate to assist in providing a uniform coating of the material to be dried and to effect a uniform drying and cooling of the material. This rotation can be simply achieved by offsetting the guiding grooves on the drums. As the wires move in the offset grooves there will be a friction effect between the sides of the grooves and the wires with the result that the wires will rotate about their axes.

In FIG. 6 is shown on an exaggerated scale how this offset groove system is used. Referring to this figure, drums 9 and 10 are offset from one another so that wires 13 deviate a small angle from the line perpendicular to the drum axes. This causes the wires to rotate about their axes by an unequal friction effect.

Although the apparatus and process of the invention can be applied for the dehydration of any liquid or pasty material it is particularly adapted for the dehydration of liquid foods such as fruit or vegetable juices, purees of fruits or vegetables, soups, meat juices, egg yolks and whites, and the like. Generally these liquid materials are first concentrated by conventional evaporation techniques under vacuum to produce a concentrate of more or less pasty character. For example the paste may have a solids content on the order of 30 to 80%. The paste is preferably then aerated by beating in air (or other inert, non-toxic gas) so that it will puff more readily under the influence of vacuum. The concentrate is then coated on the wires and subjected to heat and vacuum as described. The amount of heat applied is regulated to get a high rate of moisture evaporation without damage to the flavor or color of the concentrate and without getting the concentrate so hot that it will collapse in volume. Actual temperatures which give optimum results will vary with different food products. In many cases, it is preferred that the temperature of the material being dried be not higher than about 100–150° F.

An important feature of the present invention lies in the system for depositing the material to be dried onto the wire carriers. The significance of this aspect of the invention is explained as follows. In conventional vacuum belt driers the material to be dried is introduced into the vacuum chamber and then applied to the belt. This system does not give good results when the material to be dried contains a gas, for example, where the material is aerated tomato juice concentrate. When such material contacts the low pressure existing in the drier chamber, it immediately expands in volume forming a foam-like mass. When this foam is then applied to the belt by means of trowel rolls or the like the gas is driven out of the mass by the mechanical action of the roll. This de-puffing action is undesirable as the end result will be that the dried product will not be porous and will not be readily rehydratable. In the device of the present invention, an entirely different system is used. The material to be dried is not directly exposed to the vacuum in the drying chamber but is first deposited on the wire carrier and then in the form of a pre-established coating is exposed to the vacuum. Thereby the material does not expand in volume until it has been deposited on the wire and after expansion has taken place, the material is not subjected to any mechanical stresses or even contact of any kind. The net result is that in the present device, the material retains a high degree of expansion throughout its treatment and the product is highly porous and exhibits a high rate of rehydration when contacted with water to form a reconstituted juice. In further explanation of this, reference is made to FIG. 3 of the drawing. Extrusion feeder 19 is located within chamber 1 so that a vacuum exists about the outside of the feeder. However the interior of feeder 19 is isolated from this low pressure because apertures 32 and 33 are sealed by the presence of wires 13a and the coating of material emerging through apertures 33. By suitable control of pump 31a, the pressure within chamber 30 can be maintained at a level higher than that existing in vessel 1 whereby the material in chamber 30 does not undergo expansion but remains in its original volume. Only when the wires 13a emerge through apertures 33 will the material, now coated on the wires, be exposed to the vacuum and thus expand to a foam-like mass. Thus one achieves the result of establishing on wires 13a a coating of foamy material without exerting any de-puffing action. Moreover the material in this condition is not subjected to any contact until it has been dried at which time its volume is set and contact cannot cause any decrease in volume. Another important aspect of this system of feeding the material is the fact that very low pressures can be used in the drying chamber without interfering with application of the material onto the wires. In conventional systems if one uses a very low pressure in the drying chamber, the introduced material may freeze solid due to the intense evaporative cooling effect. Once the material has frozen, it cannot even be applied to a belt. In the present device, if freezing does occur due to extremely low pressure, it will take place after the coating has emerged into the drying zone and after the material has been expanded in volume. Thus since the freezing occurs at this stage it does not interfere with the operation. It may be noted that dehydration at very low pressures is often desirable to avoid damage to the flavor and color of food products so that it is an advantage to be able to operate successfully under such conditions.

Having thus described my invention, I claim:

1. A dehydration apparatus comprising a vessel, means for maintaining a vacuum within said vessel; a conveyor and means supporting and moving said conveyor in a predetermined path within said vessel; coating means comprising a closed reservoir having a substantially sealed inlet for said conveyor and an outlet for said conveyor having an area greater than the cross-sectional area of said conveyor, said outlet communicating with the interior of said vessel and sealed against the ambient atmosphere; means for supplying fluent coating material under pressure into said reservoir whereby said material is extruded through said outlet and onto said conveyor to form a coating thereabout, said coating expanding upon being exposed to the vacuum in said vessel; means within said vessel for heating the expanded coating on said conveyor to evaporate liquid therefrom; and means within said vessel for removing dried coating from said conveyor.

2. A dehydration apparatus comprising a vessel, means for maintaining a vacuum within said vessel; a conveyor and means supporting and moving said conveyor in a predetermined path within said vessel; coating means within said vessel through which said conveyor is moved, said coating means comprising a closed reservoir having a substantially sealed inlet for said conveyor and an outlet for said conveyor having an area greater than the cross-sectional area of said conveyor; means for supplying fluent coating material under pressure into said reservoir whereby said material is extruded through said outlet and onto said conveyor to form a coating thereabout; said coating expanding upon being exposed to the vacuum in said vessel; means within said vessel for heating the expanded coating on said conveyor to evaporate liquid therefrom; and means within said vessel for removing dried coating from said conveyor.

3. A dehydration apparatus comprising a vessel; means for maintaining a vacuum within said vessel; a conveyor wire and means supporting and moving said wire in a predetermined path within said vessel; coating means comprising a closed reservoir having a substantially sealed inlet for said wire and an outlet for said wire having an area greater than the cross-sectional area of said wire, said outlet communicating with the interior of said vessel and sealed against the ambient atmosphere; means for supplying fluent coating material under pressure into said reservoir whereby said material is extruded through said outlet and onto said wire to form a coating thereabout, said coating expanding upon being exposed to the vacuum in said vessel; means within said vessel for heating the expanded coating on said wire to evaporate liquid therefrom; and means within said vessel for removing dried coating from said wire.

4. A dehydration apparatus comprising a vessel; means for maintaining a vacuum within said vessel; a conveyor wire and means for supporting and moving said wire in a predetermined path within said vessel; coating means within said vessel through which said wire is moved, said coating means comprising a closed reservoir having a substantially sealed inlet for said wire and an outlet for said wire having an area greater than the cross-sectional area of said wire; means for supplying fluent coating material under pressure into said reservoir whereby said material is extruded through said outlet and onto said wire to form a coating thereabout, said coating expanding upon being exposed to the vacuum in said vessel; means within said vessel for heating the expanded coating on said wire to evaporate liquid therefrom; and means within said vessel for removing the dried coating from said wire.

5. A dehydration apparatus comprising a vessel; means for maintaining a vacuum within said vessel; a conveyor wire and means for supporting and moving said wire in a predetermined path within said vessel; coating means within said vessel through which said wire is moved, said coating means comprising a closed reservoir having a substantially sealed inlet for said wire and an outlet for said wire having an area greater than the cross-sectional area of said wire; means for supplying fluent coating material under pressure into said reservoir whereby said material is extruded through said outlet and onto said wire to form a coating thereabout, said coating expanding upon being exposed to the vacuum in said vessel; means within said vessel for heating the expanded coating on said wire to evaporate liquid therefrom; means within said vessel for cooling the heated coating after it has been dried; and means within said vessel for removing the dried and cooled coating from said wire.

6. A dehydration apparatus comprising a vessel; means for maintaining a vacuum within said vessel; an endless conveyor wire and spaced rollers for supporting and moving said wire in a plurality of predetermined paths on each side of said rollers within said vessel; coating means within said vessel disposed on both sides of said rollers through which said wire is moved, said coating means comprising a closed reservoir having a substantially sealed inlet for the wire in each of said predetermined paths and an outlet for the wire in each of said paths having an area greater than the cross-sectional area of said wire; means for supplying fluent coating material under pressure into each of said reservoirs whereby said material is extruded through said outlets and onto said wire in each of said paths to form coatings thereabout, said coatings expanding upon being exposed to the vacuum in said vessel; means within said vessel for heating the expanded coatings on said wire to evaporate liquid therefrom; and means within said vessel for removing the dried coatings from said wire.

7. A dehydration apparatus comprising a vessel; means for maintaining a vacuum within said vessel; an endless conveyor wire and spaced rollers for supporting and moving said wire in a plurality of predetermined paths on each side of said rollers within said vessel; means for rotating said wire about its axis; coating means within said vessel disposed on both sides of said rollers through which said wire is moved, said coating means comprising a closed reservoir having a substantially sealed inlet for the wire in each of said predetermined paths and an outlet for the wire in each of said paths having an area greater than the cross-sectional area of said wire; means for supplying fluent coating material under pressure into each of said reservoirs whereby said material is extruded through said outlets and onto said wire in each of said paths to form coatings thereabout, said coatings expanding upon being exposed to the vacuum in said vessel; means within said vessel for heating the expanded coatings on said wire to evaporate liquid therefrom; means within said vessel for cooling the heated and dried coatings; and scraping means for removing the cooled coatings from said wire.

References Cited in the file of this patent

UNITED STATES PATENTS

| | | |
|---|---|---|
| 1,653,390 | Coltman | Dec. 20, 1927 |
| 2,438,135 | Swartz et al. | Mar. 23, 1948 |
| 2,439,384 | Fetzer | Apr. 13, 1948 |
| 2,444,124 | Wedler | June 29, 1948 |
| 2,748,886 | Wildebour | June 5, 1956 |

FOREIGN PATENTS

| | | |
|---|---|---|
| 28,424 | Great Britain | Apr. 13, 1905 |